Figure 1:
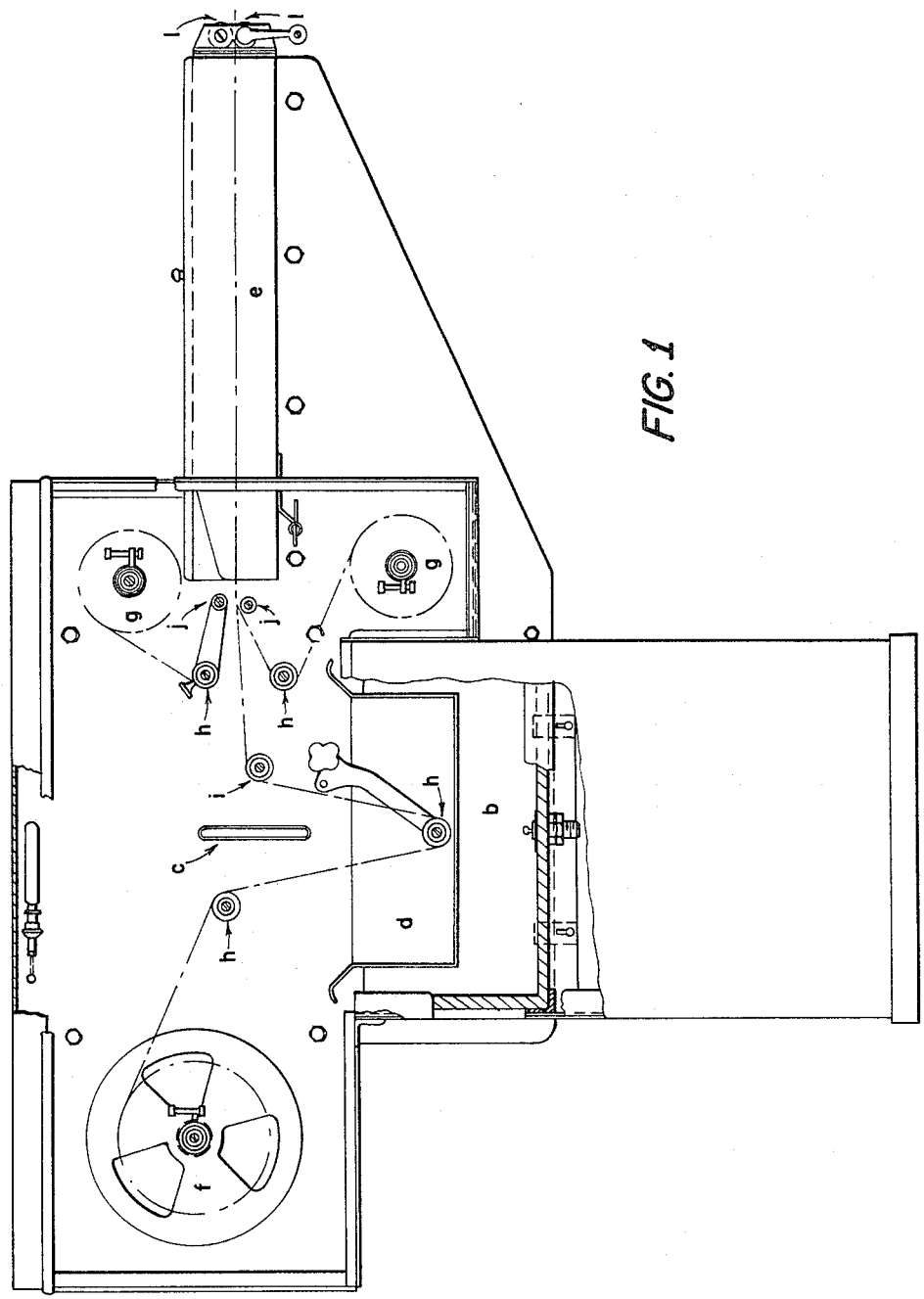
Figure 2:
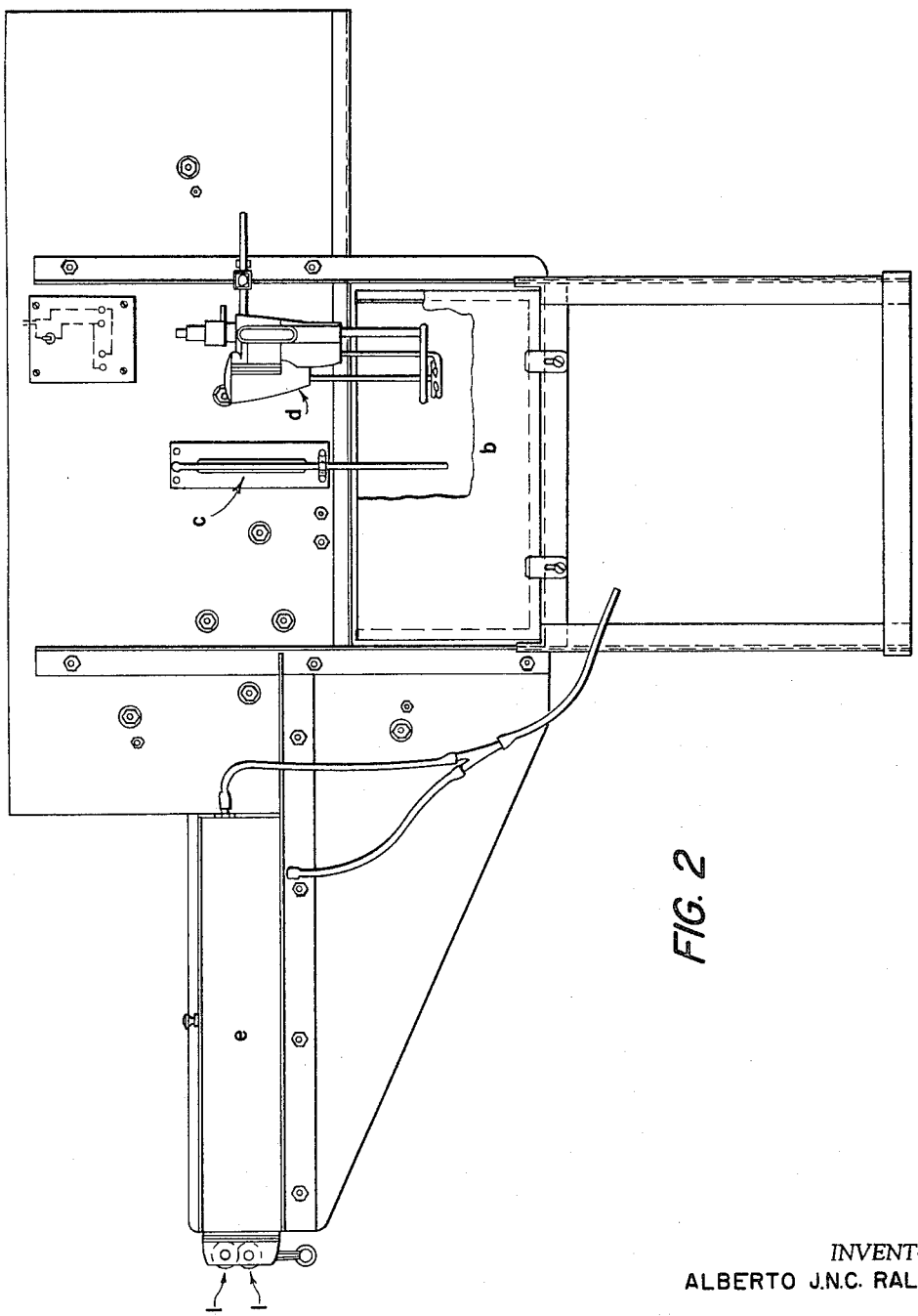

INVENTOR
ALBERTO J.N.C. RALHA

BY *Larson and Taylor*
ATTORNEYS

United States Patent Office 3,395,063
Patented July 30, 1968

3,395,063
PROCESS FOR THE PREPARATION OF
STERILE DRESSINGS
Alberto José Nunes Correia Ralha, Lisbon, Portugal, assignor to Pires and Mourato Vermelho, Limitada, Lisbon, Portugal, a corporation
Filed Apr. 4, 1963, Ser. No. 270,702
Claims priority, application Portugal, Apr. 10, 1962, 39,478
4 Claims. (Cl. 156—295)

The present invention relates to the process for the preparation of sterile dressings. Gauze dressings impregnated with ointments, containing principally bacteriostatic or antibiotic agents have been used for a long time.

More recently (Owens, N., "Rayon: an ideal surgical dressing for surface wounds," Surgery 19:48(1946)) it was ascertained that rayon gauze can, with advantage be substituted for cotton. Rayon impregnated with ointment constitutes an ideal material for dressings of superficial lesions.

The applications of these dressings (extensive burns, grafts, plastic surgery, etc.) requires preparation and packing which insure sterility of the product. Thus the study of a practical method that leads to the desired results was justified.

The process which is the object of the invention permits the following successive operations to be carried out in sterile conditions:

(1) Impregnation of rayon tissue by ointment.
(2) Elimination of excessive ointment, if necessary.
(3) Covering both sides of the impregnated tissue with a sterile protecting material.
(4) Solidification of the ointment.
(5) Cutting of the protected and impregnated rayon in desired sizes.

The dressings prepared by this method offer the following advantages:

(a) The use of any dressing from the packings can be made without contamination of the remaining dressings.
(b) Also, without risk of contamination the same dressing can be cut, by means of sterilized scissors and can be used in diverse curative situations. In this way the use of the dressing will be economical, hygienic and adequate for all cutaneous lesions, whatever their form or extent.

The process comprises:

(1) Impregnating a fabric with ointment. This can be accomplished by unrolling, under sterile conditions, a ribbon of sterilized rayon, nylon, cotton, etc. and immersing it in a bath of liquid ointment. The bath is kept at a temperature sufficient to maintain the ointment in a liquid state.

(2) Removing, if necessary, any excess ointment from the impregnated ribbon. This can be accomplished by passing the impregnated ribbon through a slit or analogous device which will effectively wipe off excess ointment.

(3) Protecting the impregnated ribbon by enclosing it in a wrapper of sterilized aluminum foil or another convenient moisture resistant material such as grease-proof paper or plastic. This step is accomplished by unrolling sterilized foils on opposite sides of the impregnated ribbon and passing the three sheets simultaneously through rolls to closely envelop the impregnated ribbon in a laminar structure.

(4) Solidification of the ointment. This is accomplished by passing the laminar structure over a cooled metal surface or through a refrigerated area at a speed suitable to cause rapid solidification of the impregnated ointment.

In the above process, the laminar structure is drawn by suitable traction means, such as opposed rolls. The rolls are conveniently located at the end of the cooled area. These opposed rolls may be designed to seal the edges of the laminar sheet by applying pressure to the edges thereof. The traction means may operate either continuously or intermittently and may employ automatic synchronized cutting means to produce dressings of various desired sizes.

The following examples are illustrative of ointment compositions useful in the instant process.

Example 1.—A formula for the preparation of rayon impregnated with an ointment of Nitrofurazone can be as follows:

|  | Grams |
|---|---|
| Nitrofurazone | 2 |
| Polyethylene glycol 300 | 498 |
| Polyethylene glycol 1540 | 450 |
| Polyethylene glycol 4000 | 50 |

Clouding range—about 45° C.

In this case, the ointment must be maintained during the operation at a temperature of 47° C.

Example 2.—A formula for the preparation of rayon impregnated with an ointment of Neomycin can be as follows:

|  | Grams |
|---|---|
| Neomycin sulfate | 0.5 |
| Polyethylene glycol 4000 | 40 |
| Polyethylene glycol 400 | 60 |

Clouding range—about 45° C.

In this case, the ointment must be maintained during the operation at a temperature of 47° C.

The drawings are illustrative of suitable apparatus for carrying out the above-described process.

FIGURE I is a front view, partially sectioned of a suitable apparatus for carrying out the present process.

FIGURE II is a back view, partially sectioned, of the apparatus of FIGURE 1.

In the drawings:
a is a container for the ointment.
b is a basin for the warm bath.
c is a thermometer for measuring the temperature of the ointment.
d shows a heater and mixer fitted with a thermostat.
e is a cooling box.
f is a bobbin for the textile to be impregnated.
g are bobbins for the protecting foils.
h are conveyance cylinders.
i is a cylinder used to take off the excess of the ointment.
j are joining cylinders.
l are traction cylinders.

The process is advantageously carried out in the aforementioned apparatus in the following manner which exemplifies a preferred embodiment of the invention.

A bobbin of gauze ribbon f and supply rolls g of aluminum foil are mounted in a sterile chamber. The gauze and aluminum foil are in a sterile condition, having been sterilized in any known manner.

A suitable medicinal ointment, such as those mentioned above, is contained in bath a. This ointment is not fluid at room temperature and a sterile heater-stirrer arrangement d of any known type, is controlled by a thermostat to regulate the ointment at a temperature above its cloud point. For the exemplified ointments, a temperature of 47° C. is sufficient. Agitation prevents localized solidification of the ointment in container a. To start the device, gauze is unrolled from bobbin f and threaded over guide rolls h through refrigeration means e and thence through traction rolls l. The gauze, which can be rayon, is thus passed through bath a and is impregnated with ointment as it is pulled, by traction rolls l, through the bath. The impregnated gauze is protected by two ribbons of aluminum foil fed from supply rolls g. The foil is guided over rolls $h$ to be in superposed relation to the impregnated gauze ribbon. The foils are slightly wider than the gauze ribbon. Guide rolls $h$ permit centering of the gauze ribbon relative to the superposed protective foils such that the wider foils overlap the gauze ribbon at both sides thereof. The aluminum foils are brought into contact with the impregnated gauze at pressure rolls $j$. The viscous ointment in a liquid state acts to adhere each foil to opposite sides of the impregnated gauze. The compact laminar structure of foils and gauze is then passed through a refrigerating area $e$. This area may be cooled with the usual refrigerant coils and controlled by a thermostat. By passing through this cooled area the ointment is cooled below its melting point. The solidified ointment acts as a good adherent between the gauze and aluminum foil. Traction rolls $l$ engage the protected gauze and are driven by a suitable motor to pull the lamination through the apparatus. These rolls supply the motive force for the gauze and protective foils. At least one is preferentially larger in diameter at the ends thereof to pressure seal the foils which overlap the centrally located gauze. Ointment exuded from the gauze acts to adhere the foils together. The motor may drive the traction rolls continuously or intermittently and the protected gauze may be cut to a desired length to produce a sterile dressing of proper size. For fully automatic operation, cutting means may be synchronized to intermittent belt motion to cut the protected gauze when stationary. A scraper roll $i$ may be employed to wipe excess ointment from the gauze before being protected by foil. Excess ointment will fall back into bath $a$. A slit or other arrangement may be used for this purpose.

What is claimed is:

1. A continuous process for the preparation of sterile dressings comprising immersing a ribbon of gauze selected from the group consisting of rayon, nylon and cotton in a heated bath of a liquified medicinal ointment, maintaining said bath at a temperature higher than the cloud point of said medicinal ointment, removing the impregnated gauze from said bath, removing excess ointment from said ribbon, passing a sterilized ribbon of protective moisture resistant material on each side of said impregnated gauze, applying pressure at ambient temperature to the protective material to form a compact sealed laminar dressing, cooling the compact dressing to solidify the medicinal ointment, and applying pressure to the edges of the dressing to seal the outside edges together, said process taking place under sterile conditions.

2. A process according to claim 1 wherein said gauze is rayon.

3. A process according to claim 1 wherein said protective material is aluminum foil.

4. A process according to claim 1 wherein said medicinal ointment comprises a polyethylene glycol carrier.

References Cited

UNITED STATES PATENTS

| 2,232,783 | 2/1941 | Hausheer | 167—84 |
| 2,306,178 | 12/1942 | Meany | 156—313 |
| 2,390,391 | 12/1945 | Ritter | 167—84 |
| 2,602,042 | 7/1952 | Abbott | 167—84 |
| 2,726,979 | 12/1955 | Grant | 156—313 |
| 2,012,403 | 8/1935 | Reimann | 156—313 |
| 2,089,034 | 8/1937 | Nevin | 156—313 |
| 2,688,042 | 7/1952 | Abbott | 167—84 |
| 2,688,586 | 9/1954 | Eberl et al. | 167—84 |
| 2,402,982 | 7/1946 | Steenbergen | 260—63 |
| 3,052,237 | 9/1962 | Chand | 128—156 |

OTHER REFERENCES

Surgery, vol. 19, pp. 482–485 (1946).

ALBERT T. MEYERS, *Primary Examiner.*

S. J. FRIEDMAN, *Assistant Examiner.*